(12) United States Patent
Reineberg et al.

(10) Patent No.: US 10,634,232 B2
(45) Date of Patent: Apr. 28, 2020

(54) SEALING ARRAY FOR A TRANSMISSION, IN PARTICULAR FOR THE OUTPUT SHAFT OF A TRANSMISSION, AND TRANSMISSION HAVING THE SEALING ARRAY

(71) Applicant: SEW-EURODRIVE GMBH & CO. KG, Bruchsal (DE)

(72) Inventors: Martin Reineberg, Durmersheim (DE); Peter Barton, Bretten (DE)

(73) Assignee: SEW-EURODRIVE GMBH & CO. KG, Bruchsal (DE)

(*) Notice: Subject to any disclaimer, the term of this patent is extended or adjusted under 35 U.S.C. 154(b) by 10 days.

(21) Appl. No.: 15/546,233

(22) PCT Filed: Dec. 1, 2015

(86) PCT No.: PCT/EP2015/002408
§ 371 (c)(1),
(2) Date: Jul. 25, 2017

(87) PCT Pub. No.: WO2016/119802
PCT Pub. Date: Aug. 4, 2016

(65) Prior Publication Data
US 2018/0023682 A1    Jan. 25, 2018

(30) Foreign Application Priority Data

Jan. 26, 2015  (DE) .................. 10 2015 000 774
Mar. 11, 2015  (DE) .................. 10 2015 003 048

(51) Int. Cl.
*F16H 57/029*    (2012.01)
*F16J 15/3204*   (2016.01)
(Continued)

(52) U.S. Cl.
CPC .......... *F16H 57/029* (2013.01); *F16J 15/002* (2013.01); *F16J 15/16* (2013.01);
(Continued)

(58) Field of Classification Search
CPC .. F16J 15/002; F16J 15/16; F16J 15/32; F16J 15/3204; F16J 15/162; F16J 15/164; F16H 57/029
See application file for complete search history.

(56) References Cited

U.S. PATENT DOCUMENTS 4,754,981 A    7/1988  Burns
5,356,320 A *  10/1994 Von Bergen ......... B63H 23/321
                                                277/562

(Continued)

FOREIGN PATENT DOCUMENTS

CN    101144542 A    3/2008
CN    202 327 111 U  7/2012
(Continued)

OTHER PUBLICATIONS

International Preliminary Report on Patentability issued in international patent application No. PCT/EP2015/002408, dated Aug. 1, 2017 (8 pages total).

(Continued)

*Primary Examiner* — Gilbert Y Lee
(74) *Attorney, Agent, or Firm* — Hunton Andrews Kurth LLP

(57) ABSTRACT

In a sealing array for a transmission, in particular for the output shaft of a transmission, and a transmission having a sealing array, a spacer ring is situated between a first and a second shaft-sealing ring, a flange part is connected to the coupling flange, in particular by screws, and a coupling flange presses the second shaft-sealing ring against the spacer ring, the spacer ring presses on the first shaft-sealing ring so that the first shaft-sealing ring is positioned against a flange part. The flange part, the coupling flange, the first shaft-sealing ring, the spacer ring, and the second shaft- (Continued)

sealing ring are arranged as a pre-assembled unit, and thus, in particular, as a transportable, integrated unit.

21 Claims, 3 Drawing Sheets

(51) Int. Cl.
*F16J 15/00* (2006.01)
*F16J 15/32* (2016.01)
*F16J 15/16* (2006.01)

(52) U.S. Cl.
CPC .......... *F16J 15/32* (2013.01); *F16J 15/3204* (2013.01); *F16J 15/162* (2013.01); *F16J 15/164* (2013.01)

(56) References Cited

U.S. PATENT DOCUMENTS

| | | | |
|---|---|---|---|
| 5,704,719 A * | 1/1998 | Cook | F16C 23/084 |
| | | | 277/353 |
| 6,328,312 B1 | 12/2001 | Schmitz et al. | |
| 2002/0047242 A1 | 4/2002 | Watanabe et al. | |
| 2003/0173746 A1 * | 9/2003 | Ramsay | F16J 15/008 |
| | | | 277/549 |
| 2004/0007821 A1 * | 1/2004 | Ramsay | F16J 15/008 |
| | | | 277/353 |
| 2005/0253340 A1 * | 11/2005 | Ramsay | B63H 23/321 |
| | | | 277/559 |
| 2013/0039611 A1 | 2/2013 | Russ et al. | |

FOREIGN PATENT DOCUMENTS

| | | |
|---|---|---|
| CN | 102782374 A | 11/2012 |
| CN | 203 792 776 U | 8/2014 |
| CN | 104053935 A | 9/2014 |
| DE | 27 06 264 A1 | 8/1978 |
| DE | 199 13 821 A1 | 10/2000 |
| DE | 200 17 157 U1 | 3/2001 |
| DE | 202 10 545 U1 | 11/2002 |
| DE | 20 2009 013 547 U1 | 5/2010 |
| DE | 10 2010 018 255 A1 | 10/2011 |
| DE | 10 2012 000666 A1 | 7/2013 |
| DE | 10 2013 012 916 A1 | 3/2014 |
| EP | 1039161 A2 | 9/2000 |

OTHER PUBLICATIONS

International Search Report dated Feb. 22, 2016, in International Application No. PCT/EP2015/002408. (English-language translation).

Office Action issued in European Patent Application No. 15807801.4, dated Oct. 22, 2018.

* cited by examiner

SEALING ARRAY FOR A TRANSMISSION, IN PARTICULAR FOR THE OUTPUT SHAFT OF A TRANSMISSION, AND TRANSMISSION HAVING THE SEALING ARRAY

FIELD OF THE INVENTION

The present invention relates to a sealing array for a transmission, in particular a sealing array for the output shaft of a transmission, and to a transmission having a sealing array.

BACKGROUND INFORMATION

It is generally known that a shaft is able to be sealed with the aid of a shaft sealing ring.

SUMMARY

Example embodiments of the present invention provide a sealing array for a transmission, in particular for the output shaft of a transmission, whose production and maintenance are to be managed in an uncomplicated manner.

According to an example embodiment of the present invention, a sealing array for a transmission, in particular for the output shaft of a transmission, includes a spacer ring disposed between a first and a second shaft-sealing ring, a flange part is connected to the coupling flange, in particular by screws, a coupling flange presses the second shaft-sealing ring against the spacer ring, and the spacer ring presses against the first shaft-sealing ring so that the first shaft-sealing ring is positioned against a flange part.

The flange part, the coupling flange, the first shaft-sealing ring, the spacer ring, and the second shaft-sealing ring are arranged as a pre-assembled unit, and thus as a transportable and integrated unit.

This is considered advantageous insofar as a simple exchange of the sealing array is able to be achieved inasmuch as only the flange part has to be removed from the housing of the transmission and to be replaced by a new sealing array. The pre-assembly of the array allows for a particularly rapid exchange and a particularly fast and simple production process.

It is also possible to exchange an existing simple cover part of the transmission for the seal. Thus, it is possible to provide an additional pressurized-air seal. The pressure differential to which an upstream sealing array is exposed is able to be reduced with the aid of the additional pressurized-air seal.

The pre-assembly is achieved by connecting the coupling flange to the flange part using screws; during the screw-fitting, the parts such as the spacer ring and the first and second shaft-sealing rings that are accommodated in the flange part in axial succession, are placed one after the other in the axial direction and are surrounded and protected by the coupling flange and the flange part, in particular in the manner of a housing.

Thus, the pre-assembly is carried out in an uncomplicated manner. Additionally, a cylinder liner may also be inserted into the shaft-sealing rings, so that the cylinder liner is likewise transportable and the sealing lips of the shaft-sealing rings already have contact with the cylinder liner and hold it. For the insertion into the transmission, the cylinder liner only needs to be connected to the shaft by screws, and the flange part to a cover part or housing part of the transmission.

The flange part and the coupling flange may delimit an annular groove whose first side wall has contact with the first shaft-sealing ring and whose opposite-lying side wall has contact with the second shaft-sealing ring. This has the advantage that the annular groove provides a receiving area for the shaft-sealing rings. The annular groove is open in the radially inward direction. In the axial direction, i.e. in the direction of the shaft axis of the shaft, in particular the hollow shaft, the annular groove is delimited by the flange part, and it is delimited in the opposite direction by the coupling flange. Radially towards the outside, the annular groove is delimited by the flange part. The annular groove extends in the circumferential direction.

The contact area of the first shaft-sealing ring and the contact area of the second shaft-sealing ring may be situated on a cylinder liner, which is connected to a shaft with the aid of screws. This has the advantage that the cylinder liner is clamped and therefore situated in the sealing array in a pre-assembled state. Thus, all that remains is for the cylinder liner to be screwed to the shaft, and for the flange part to be screwed to the housing of the transmission, in particular to the cover part.

The space region delimited by the flange part, the coupling flange, the second shaft-sealing ring as well as the cylinder liner and/or the shaft may be acted upon by pressurized air, the supply of pressurized air being implemented through the coupling flange, in particular. This has the advantage that a higher type of protection is able to be achieved by the pressurized-air seal.

A sealing element, in particular an O-ring, may be situated between the flange part and the coupling flange in order to seal the connection of the flange part to the coupling flange. This has the advantage of obtaining high tightness.

The spacer ring may have a smaller radial extension than the first and/or the second shaft-sealing ring, the spacer ring being set apart from the cylinder liner and the shaft, in particular so that a grease chamber is formed between the first and the second shaft-sealing ring. This is considered advantageous in that because of the radial recess, a space region may be used as a grease chamber.

The flange part may be connected to a cover part of the transmission, in particular of the housing of the transmission, and the screw heads of the screws used for the connection are overlapped and/or covered by the coupling flange, in particular. This has the advantage that the pre-assembled unit is able to be connected to the housing of the transmission in an uncomplicated manner.

The cylinder liner may be connected to the shaft with the aid of axially directed screws, the screws especially being screwed into respective threaded bores provided on the end face of the shaft situated at an axial end of the shaft. This is considered advantageous insofar as it allows for the use of a connection that is easy to produce.

The shaft, which may be arranged as a hollow shaft, and the coupling flange may have an annular groove, whose ring axis is aligned particularly coaxially to the axis of the shaft, i.e. the shaft axis, in particular, an axial end area of the shaft and/or the cylinder liner projecting at least partially into the annular groove. This has the advantage that a space region for pressurized air is produced in an uncomplicated manner.

A cascading sealing array may be situated between the shaft and the cover part, which particularly seals the shaft from the housing and thus seals the interior of the transmission, which is partially or completely filled with oil, from the external environment, the cascading sealing array particularly having a shaft-sealing ring sealing array, a lamellar seal, and a labyrinth seal, the shaft-sealing ring sealing array particularly being accommodated in the housing of the transmission. This is considered advantageous insofar as high tightness is able to be achieved.

The coupling flange may be screwed to the flange part such that the first and the second shaft-sealing rings are situated between the coupling flange and the flange part and the spacer ring is situated between the first and the second shaft-sealing rings, in particular such that the coupling flange, the flange part, the spacer ring, the first shaft-sealing ring and the second shaft-sealing ring form a pre-assembled unit. This is considered advantageous insofar as a pre-assembly is achievable in an uncomplicated manner.

In a transmission having the sealing array, the shaft may be arranged as the output shaft of the transmission.

This has the advantage that a cascading seal is easily sealable with the aid of an additional pressurized-air seal. A cascading sealing array is therefore able to be further improved, and a higher type of protection is achievable for the transmission.

Example embodiments of the present invention are described in greater detail with reference to the Figures.

DETAILED DESCRIPTION

Figure 1:
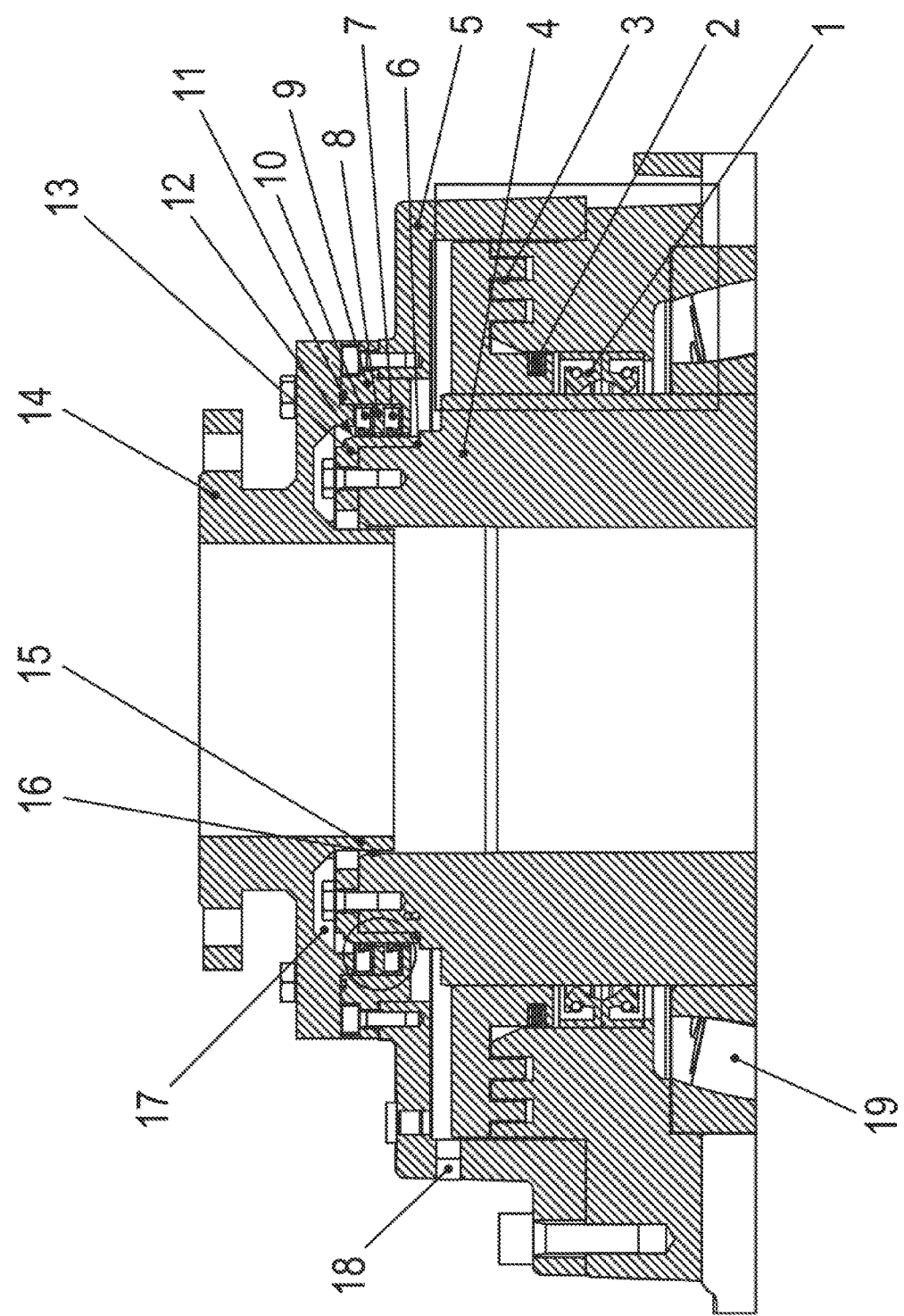
FIG. 1 shows a cross-sectional view of a transmission according to an example embodiment of the present invention.
Figure 2:
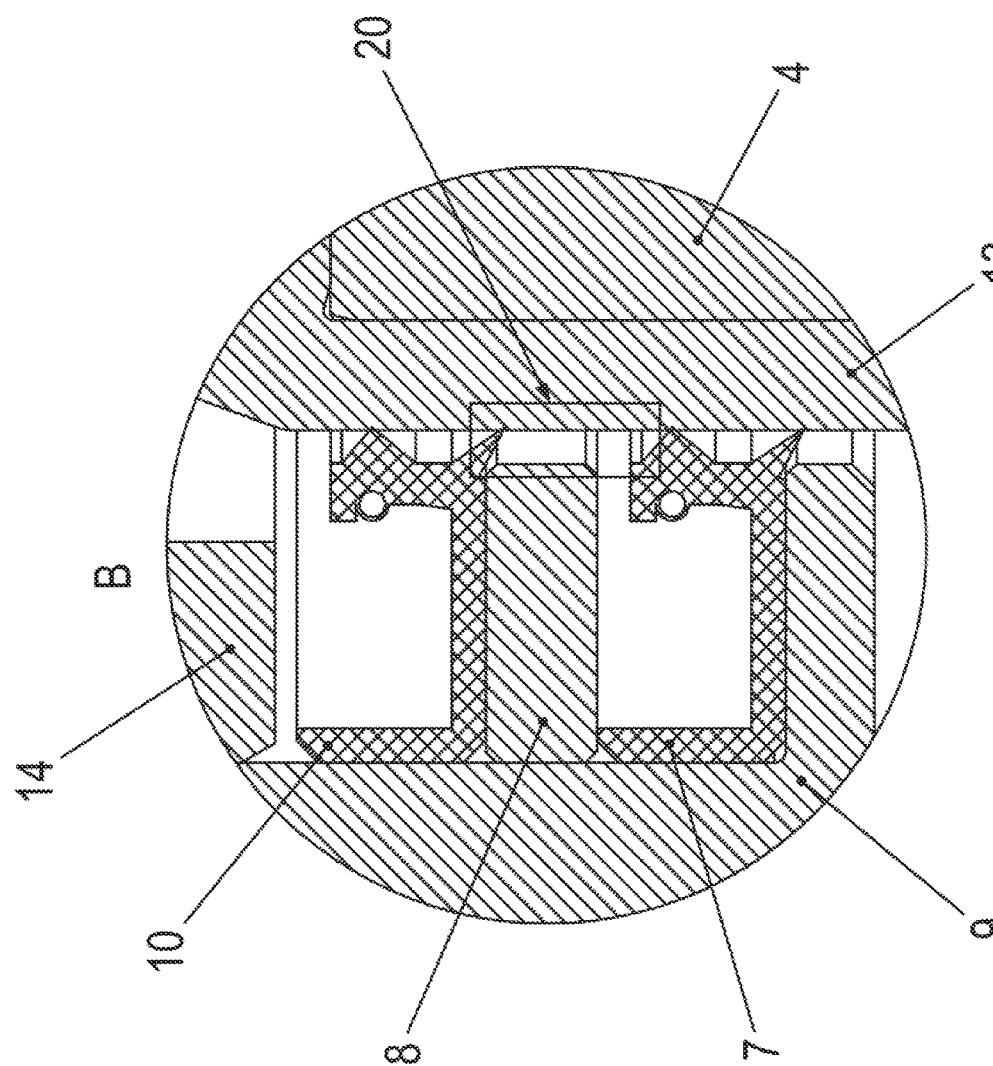
FIG. 2 shows an enlarged cross-sectional view of the transmission illustrated in FIG. 1.
Figure 3:
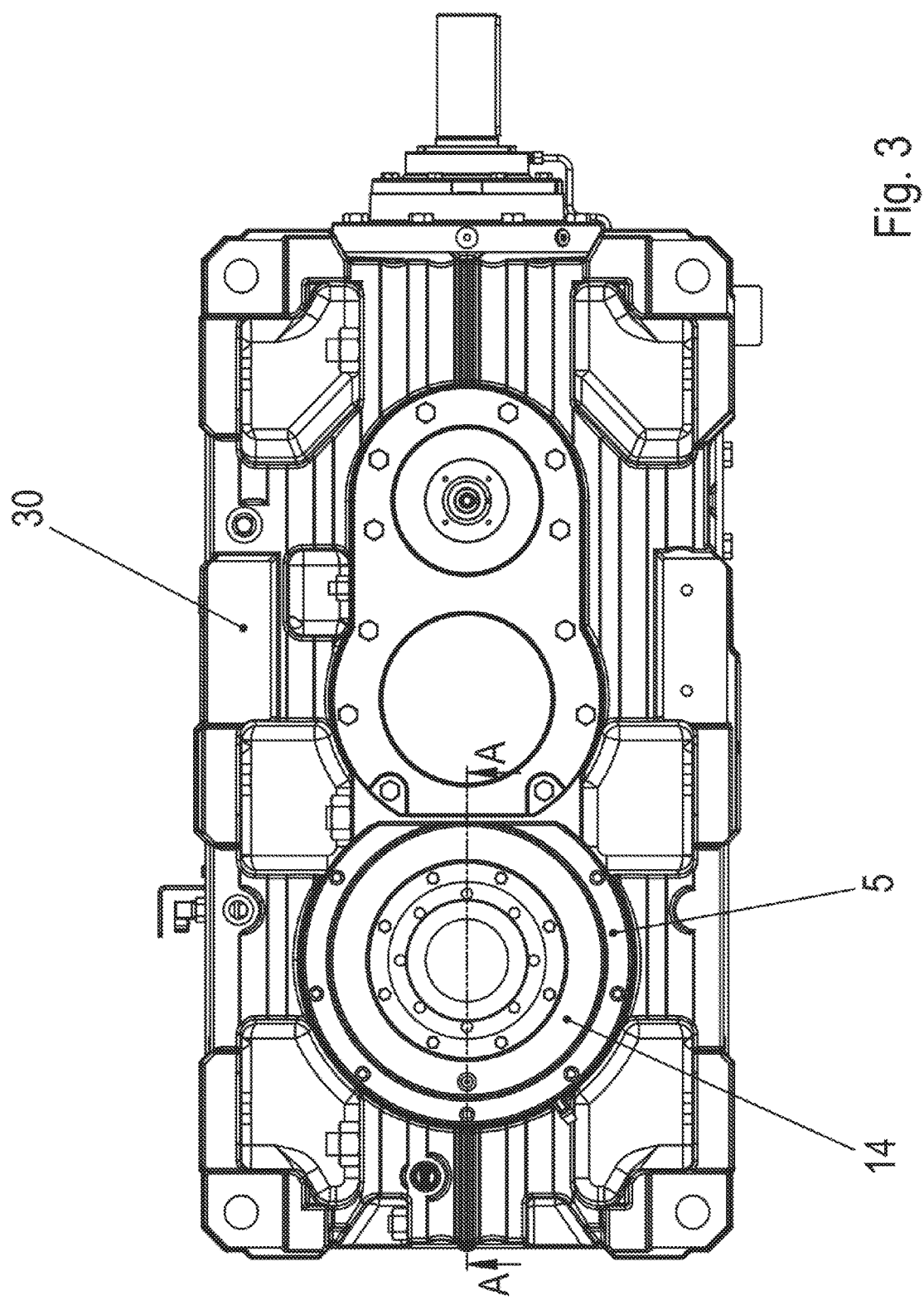
FIG. 3 shows the transmission in a side view.

As illustrated in the Figures, transmission 30 has a shaft 4, which is arranged as an output shaft. Shaft 4 is provided as a hollow shaft.

Shaft 4 is mounted in the housing of transmission 30 via bearings 19, which are arranged as angular contact bearings in the exemplary embodiment.

One of the axial end areas of shaft 4 projects from the housing and is therefore covered by both a cover part 5 fixed in place on the housing and a coupling flange fixed in place on cover part 5.

The screw connection may be selected as the fastening type.

Provided axially outside the covered axial region between bearings 19 is a cascading sealing array, which seals shaft 4 from the housing and thus seals the interior of the transmission, which is partially or completely filled with oil, from the external environment. Here, first a shaft-sealing ring sealing array 1, a lamellar seal 2 and a labyrinth seal 3 are provided from the inside towards the outside. Shaft-sealing ring sealing array 1 is accommodated in the housing of transmission 30 and runs on shaft 4.

A cylinder liner 13 is connected to shaft 4 at the axial end of shaft 4, in particular by a screw connection with the aid of screws that are screwed into axially directed threaded bores situated on the end face of shaft 4.

Cylinder liner 13 offers a contact area for a first shaft-sealing ring 7 and a second shaft-sealing ring 10.

Shaft-sealing rings 7 and 10 are axially set apart from each other with the aid of spacer ring 8 and accommodated in a flange part 9.

First shaft-sealing ring 7 is placed against a step in flange part 9 in the axial direction, the step being provided in the form of a collar that projects radially towards the inside. Spacer ring 8 is disposed on the side of first shaft-sealing ring 7 facing away from the step, and second shaft-sealing ring 10 is disposed on the side of spacer ring 8 facing away from first shaft-sealing ring 7. In the direction facing axially away from the step, the system including the first and second shaft-sealing rings (7, 10) as well as spacer ring 8 is delimited by a coupling flange 14, which is connected to flange part 9, in particular with the aid of screws.

On its side facing shaft 4, coupling flange 14 has an annular depression into which the axial end of shaft 4, implemented as a hollow shaft, at least partially projects. Space region 17, which remains free in the annular depression, is delimited by coupling flange 14 and shaft 4 together with cylinder liner 13, which are sealed from coupling flange 14 in the radially outward direction with the aid of the first and second shaft-sealing rings (7, 10). Only a small gap between coupling flange 14 and shaft 4 leads from space region 17 radially inward towards the free interior space region of shaft 4 implemented as a hollow shaft.

Coupling flange 14 has an uninterrupted bore, which leads from the outside to space region 17 so that pressurized air is able to be routed into space region 17 from the outside. This improves the tightness of the entire sealing of shaft 4 with respect to the housing.

In the event of overpressure, a bore extending through cover part 5 routes air from the space region between the cascading sealing array and the sealing array between cylinder liner 13 and flange part 9 formed by the first and second shaft-sealing rings (7, 10). The interior of the transmission is therefore able to be protected from overpressure. A pressure-relief valve or a ventilation device may be disposed in bore 18 for that purpose.

A sealing element 6, which is arranged as an O-ring, is situated between cylinder liner 13 and shaft 4. This seals cylinder liner 13 with respect to shaft 4.

The space region between the cascading sealing array and the sealing array formed by the first and the second shaft-sealing ring (7, 10) is by cover part 5, flange part 9, cylinder liner 13, shaft 4, and by the housing part accommodating the cascading sealing array, in particular labyrinth seal 3.

A second sealing element 11, arranged as an O-ring, is disposed between flange part 9 and cover part 5 for the tight connection of flange part 9 to cover part 5.

In the process, flange part 9 exerts pressure on second shaft-sealing ring 10, which is thereby pressed against spacer ring 8, so that spacer ring 8 is in turn pressed against first shaft-sealing ring 7, which thus exerts pressure on coupling flange 14. In this manner, this sealing array is able to be produced in a pre-assembled form. This means that spacer ring 8, the first and second shaft-sealing rings (7, 10), the flange part 9, and the coupling flange 14 are assembled in a separate production step. The contact pressure induced during the screw-fitting process holds this sealing array together.

For the installation in the transmission, cylinder liner 13 has only to be connected to shaft 4 by screws, whereupon this sealing array must be mounted on the housing, in particular on cover part 5, of the transmission, in particular using a screw connection.

As an alternative, cover part 5 is already connected to this sealing array by screws during the pre-assembly and will then be transported as such a pre-assembled unit and installed in the transmission by connecting cover part 5 to the one further housing part of the housing of the transmission.

The screws that are inserted in order to connect cover part 5 to flange part 9 are situated so as to be covered by coupling flange 14. This is so because when coupling flange 14 is positioned and connected by screws, the screw heads that are situated in a recessed manner in a depression of flange part 9 will be covered.

The screw heads of the screws connecting cylinder liner 13 to shaft 4 likewise project into the aforementioned space region 17, which is acted upon by pressurized air and is also delimited by at least coupling flange 14.

A chamfer 12 implemented on cylinder liner 13 makes it easier to thread the cylinder liner into first shaft-sealing ring 7.

Collar 15 implemented on coupling flange 14 is dimensioned such that the air gap, i.e. annular gap 16, between collar 15 and shaft 4 is such so that a provided pressure differential between the pressure in space region 17 and the pressure in the external environment is attained.

Spacer ring 8 has a smaller radial extension than first shaft-sealing ring 7 and second shaft-sealing ring 10. In this manner, a grease chamber 20 is created in the axial direction, which may be filled with grease during the production of the sealing array.

Because of the pre-assembly, grease may be filled into filling grease chamber 20 already during the production of the sealing array i.e. already prior to the installation in transmission 30.

The grease chamber is delimited by cylinder liner 13, first shaft-sealing ring 7, second shaft-sealing ring 10, and spacer ring 8. As a result, grease is also able to be added to the region that is surrounded by first shaft-sealing ring 7.

LIST OF REFERENCE NUMERALS 1 shaft-sealing ring sealing array
2 lamellar seal
3 labyrinth seal
4 shaft, in particular an output shaft, in particular a hollow shaft
5 cover part
6 sealing element, in particular an O-ring
7 first shaft-sealing ring
8 spacer ring
9 flange part
10 second shaft-sealing ring
11 sealing element, in particular an O-ring
12 chamfer on cylinder liner 13
13 cylinder liner
14 coupling flange
15 collar
16 annular gap
17 space region
18 bore for the screw plug
19 bearing
20 grease chamber
30 transmission

The invention claimed is:

1. A sealing array for a transmission, comprising:
a first shaft-sealing ring;
a second shaft sealing ring;
a spacer ring arranged between the first shaft-sealing ring and the second shaft-sealing ring;
a flange part;
a coupling flange screw-connected to the flange part and pressing the second shaft-sealing ring against the spacer ring to press the spacer ring against the first shaft-sealing ring and the first shaft-sealing ring against the flange part.

2. The sealing array according to claim 1, wherein the flange part, the coupling flange, the first shaft-sealing ring, the spacer ring, and the second shaft-sealing ring are arranged as a pre-assembled unit.

3. The sealing array according to claim 2, wherein the pre-assembled unit is arranged as a transportable and integrated unit.

4. The sealing array according to claim 1, wherein the sealing array is arranged as a sealing array for an output shaft of the transmission.

5. A sealing array for a transmission, comprising:
a first shaft-sealing ring;
a second shaft sealing ring;
a spacer ring arranged between the first shaft-sealing ring and the second shaft-sealing ring;
a flange part; and
a coupling flange screw-connected to the flange part and pressing the second shaft-sealing ring against the spacer ring to press the spacer ring against the first shaft-sealing ring and the first shaft-sealing ring against the flange part;
wherein the flange part and the coupling flange delimit an annular groove having a first side wall in contact with the first shaft-sealing ring and an opposite side wall in contact with the second shaft-sealing ring.

6. The sealing array according to claim 1, wherein a contact surface of the first shaft-sealing ring and a contact surface of the second shaft-sealing ring are arranged on a cylinder liner screw-connected to a shaft.

7. The sealing array according to claim 6, wherein a space region, delimited by the flange part, the coupling flange, the second shaft-sealing ring, the cylinder liner, and/or the shaft, is acted upon by pressurized air.

8. The sealing array according to claim 7, wherein the coupling flange is adapted to supply the pressurized air therethrough.

9. The sealing array according to claim 6, wherein the spacer ring has a smaller radial extension than the first shaft-sealing ring and/or the second shaft-sealing ring, the spacer ring being set apart from the cylinder liner and the shaft, to provide a grease chamber between the first shaft-sealing ring and the second shaft-sealing ring.

10. A sealing array for a transmission, comprising:
a first shaft-sealing ring;
a second shaft sealing ring;
a spacer ring arranged between the first shaft-sealing ring and the second shaft-sealing ring;
a flange part; and
a coupling flange screw-connected to the flange part and pressing the second shaft-sealing ring against the spacer ring to press the spacer ring against the first shaft-sealing ring and the first shaft-sealing ring against the flange part;
wherein a contact surface of the first shaft-sealing ring and a contact surface of the second shaft-sealing ring are arranged on a cylinder liner screw-connected to a shaft; and
wherein the cylinder liner is connected to the shaft by axially directed screws.

11. The sealing array according to claim 10, wherein the axially directed screws are screwed into respective threaded bores provided on an end face of the shaft located at an axial end of the shaft.

12. A sealing array for a transmission, comprising:
a first shaft-sealing ring;
a second shaft sealing ring;
a spacer ring arranged between the first shaft-sealing ring and the second shaft-sealing ring;
a flange part; and a coupling flange screw-connected to the flange part and pressing the second shaft-sealing ring against the spacer ring to press the spacer ring against the first shaft-sealing ring and the first shaft-sealing ring against the flange part;

wherein a contact surface of the first shaft-sealing ring and a contact surface of the second shaft-sealing ring are arranged on a cylinder liner screw-connected to a shaft; and wherein the shaft is arranged as a hollow shaft and the coupling flange includes an annular groove, having a ring axis aligned coaxially to a shaft axis of the shaft, an axial end area of the shaft and/or the cylinder liner at least partially projecting into the annular groove.

13. The sealing array according to claim 6, wherein a cascading sealing array is arranged between the shaft and a cover part, adapted to seal the shaft from a housing of the transmission and to seal an interior of the transmission, that is partially or completely filled with oil, from an external environment.

14. A sealing array for a transmission, comprising:
a first shaft-sealing ring;
a second shaft sealing ring;
a spacer ring arranged between the first shaft-sealing ring and the second shaft-sealing ring;
a flange part; and
a coupling flange screw-connected to the flange part and pressing the second shaft-sealing ring against the spacer ring to press the spacer ring against the first shaft-sealing ring and the first shaft-sealing ring against the flange part;
wherein a contact surface of the first shaft-sealing ring and a contact surface of the second shaft-sealing ring are arranged on a cylinder liner screw-connected to a shaft;
wherein a cascading sealing array is arranged between the shaft and a cover part, adapted to seal the shaft from a housing of the transmission and to seal an interior of the transmission, that is partially or completely filled with oil, from an external environment; and
wherein the cascading sealing array includes a shaft-sealing ring sealing array, a lamellar seal, and a labyrinth seal.

15. A sealing array for a transmission, comprising:
a first shaft-sealing ring;
a second shaft sealing ring;
a spacer ring arranged between the first shaft-sealing ring and the second shaft-sealing ring;
a flange part;
a coupling flange screw-connected to the flange part and pressing the second shaft-sealing ring against the spacer ring to press the spacer ring against the first shaft-sealing ring and the first shaft-sealing ring against the flange part; and
a seal and/or an O-ring arranged between the flange part and the coupling flange adapted to seal a connection of the flange part to the coupling flange.

16. The sealing array according to claim 1, wherein the flange part is connected to a cover part of the transmission and/or a housing of the transmission.

17. The sealing array according to claim 16, wherein screw heads of screws of the screw-connection are overlapped and/or covered by the coupling flange.

18. The sealing array according to claim 1, wherein the shaft-sealing ring sealing array is accommodated in the housing of the transmission.

19. The sealing array according to claim 1, wherein the coupling flange is screwed to the flange part such that the first shaft-sealing ring and the second shaft-sealing ring are arranged between the coupling flange and the flange part and the spacer ring is situated between the first shaft-sealing ring and the second shaft-sealing ring.

20. The sealing array according to claim 19, wherein the coupling flange, the flange part, the spacer ring, the first shaft-sealing ring, and the second shaft-sealing ring form a pre-assembled unit.

21. A transmission, comprising:
an output shaft;
a sealing array according to claim 1 adapted to seal the output shaft.

* * * * *